United States Patent [19]

Lutter et al.

[11] Patent Number: 5,494,941
[45] Date of Patent: Feb. 27, 1996

[54] PREPARATION OF CHLOROFLUOROCARBON-FREE FLEXIBLE POLYURETHANE FOAMS USING DIPHENYLMETHANE DIISOCYANATE-BASED POLYISOCYANATE MIXTURES CONTAINING URETHANE GROUPS, AND MODIFIED POLYISOCYANATE MIXTURES OF THE TYPE

[75] Inventors: Heinz-Dieter Lutter, Neckargemuend; Bernd Bruchmann, Ludwigshafen; Claudia Spang, Eisenberg-Steinborn; Roland Minges, Gruenstadt; Dietrich Scherzer, Neustadt; Michael Lugmayr, Groebenzell; Ruth Zschiesche, Mannheim, all of Germany

[73] Assignee: BASF Aktiengesellschaft, Ludwigshafen, Germany

[21] Appl. No.: 15,746

[22] Filed: Feb. 10, 1993

[30] Foreign Application Priority Data

Feb. 11, 1992 [DE] Germany ............ 42 03 918.5

[51] Int. Cl.⁶ .................................................. C08G 18/00
[52] U.S. Cl. ............................ 521/159; 521/170; 521/174
[58] Field of Search .................................. 528/59, 67, 76, 528/77; 521/159, 170, 174

[56] References Cited

U.S. PATENT DOCUMENTS

| | | | |
|---|---|---|---|
| 3,336,242 | 8/1967 | Hampson et al. | |
| 3,644,457 | 2/1972 | König et al. | |
| 3,968,089 | 7/1976 | Cuscurida et al. | |
| 4,031,026 | 6/1977 | Ibbotson. | |
| 4,055,548 | 10/1977 | Carleton et al. | |
| 4,229,347 | 10/1980 | Holt et al. | |
| 4,237,240 | 12/1980 | Jarre et al. | |
| 4,251,639 | 2/1981 | Jarre et al. | |
| 4,261,852 | 4/1981 | Carroll et al. | 521/160 |
| 4,478,960 | 10/1984 | Buethe et al. | 521/160 |
| 4,738,991 | 4/1988 | Narayan. | |
| 4,743,626 | 5/1988 | Narayan. | |
| 4,888,365 | 12/1989 | Riley et al. | |
| 4,937,012 | 6/1990 | Kan et al. | |
| 4,945,117 | 7/1990 | Gansen et al. | 521/99 |
| 5,059,633 | 10/1991 | Lutter et al. | 521/160 |
| 5,070,114 | 12/1991 | Watts et al. | |
| 5,091,437 | 2/1992 | Lunardon et al. | |
| 5,132,334 | 7/1992 | Gansen et al. | |

FOREIGN PATENT DOCUMENTS

| | | |
|---|---|---|
| 10850 | 5/1980 | European Pat. Off. . |
| 22617 | 1/1981 | European Pat. Off. . |
| 102541A2 | 3/1984 | European Pat. Off. . |
| 116309 | 8/1984 | European Pat. Off. . |
| 439792A2 | 8/1991 | European Pat. Off. . |
| 480090A1 | 4/1992 | European Pat. Off. . |
| 1064576 | 4/1967 | United Kingdom . |
| 1079105 | 8/1967 | United Kingdom . |
| 1369334 | 10/1974 | United Kingdom . |
| 1377679 | 12/1974 | United Kingdom . |
| 1381925 | 1/1975 | United Kingdom . |
| 1430455 | 3/1976 | United Kingdom . |
| 1444192 | 7/1976 | United Kingdom . |
| 1450660 | 9/1976 | United Kingdom . |
| 1480972 | 7/1977 | United Kingdom . |
| 1550325 | 8/1979 | United Kingdom . |
| 2109803A | 6/1983 | United Kingdom . |

*Primary Examiner*—Nathan M. Nutter
*Assistant Examiner*—John M. Cooney, Jr.

[57] ABSTRACT

The invention relates to a process for the preparation of CFC-free, flexible polyurethane foams or molded foams by reacting A) liquid polyisocyanate mixtures containing bonded urethane groups and having a content of NCO groups of from 20 to 30% by weight, these mixtures themselves being prepared by reacting a mixture of diphenylmethane diisocyanates and polyphenyl-polymethylene polyisocyanates (crude diphenylmethane diisocyanate) with a polyether-polyol mixture, having a hydroxyl number of from 120 to 25, of at least one polyoxypropylene glycol and at least one trifunctional polyoxypropylene-polyoxyethylene glycol having a content of ethylene oxide units of from 90 to 10% by weight or by reacting 4,4'-diphenylmethane diisocyanate (diphenylmethyl diisocyanate) or an diphenylmethane diisocyanate isomer mixture with said polyether-polyol mixture to give an NCO-containing quasi-prepolymer and diluting this quasi-prepolymer with crude diphenylmethane diisocyanate, with B) relatively high-molecular-weight polyhydroxyl compounds.

8 Claims, No Drawings

PREPARATION OF CHLOROFLUOROCARBON-FREE FLEXIBLE POLYURETHANE FOAMS USING DIPHENYLMETHANE DIISOCYANATE-BASED POLYISOCYANATE MIXTURES CONTAINING URETHANE GROUPS, AND MODIFIED POLYISOCYANATE MIXTURES OF THE TYPE

The present invention relates to a process for the preparation of chlorofluorocarbon-(CFC-)free flexible polyurethane (PU) foams or flexible, elastic PU molded foams from starting materials which are known per se, but using specific diphenylmethane diisocyanate-(MDI-)based polyisocyanate mixtures which have been modified by urethane groups and contain from 20 to 30% by weight of NCO groups, these mixtures having themselves been prepared by reacting a mixture of diphenylmethane diisocyanates and polyphenyl-polymethylene polyisocyanates (crude MDI) with a polyether-polyol mixture, having a hydroxyl number of from 120 to 25, of at least one polyoxypropylene glycol and at least one trifunctional polyoxypropylene-polyoxyethylene-polyol containing from 10 to 90% by weight of polymerized ethylene oxide units or by reacting 4,4'-MDI or an MDI isomer mixture with said polyether-polyol mixture to give an NCO-containing quasi-prepolymer and diluting this quasi-prepolymer with crude MDI, and to liquid polyisocyanate mixtures of this type containing bonded urethane groups.

The preparation of flexible PU foams or flexible, elastic PU molded foams by reacting high-molecular-weight polyhydroxyl compounds, preferably polyester- or polyether-polyols, and, if desired, chain extenders and/or crosslinking agents with organic and/or modified organic polyisocyanates is known and is described in numerous patents and other publications.

An example which may be mentioned is the Kunst-stoff-Handbuch, Volume VII, Polyurethane, Carl Hanser Verlag, Munich, 1st Edition, 1966, edited by Dr. R. Vieweg and Dr. A. Höchtlen, and 2nd Edition, 1983, edited by Dr. G. Oertel.

A suitable choice of the formative components and their mixing ratios allows flexible PU foams having very good properties, in particular having high tear strength and high compressive strength, to be obtained.

According to DE-C-1520737 (U.S. Pat. No. 3,336,242), PU foams having an open cell structure can be prepared by a one-step process by reacting polyisocyanates with polyoxypropylene-polyoxyethylene-triols having molecular weights of from 3000 to 8000 and containing, in bonded form, from 3 to 5% by weight of ethylene oxide as end blocks and glycerol as initiator molecule.

According to GB-A-1,079,105, very flexible PU foams are obtained from a polyether-polyol or a poly-ether-polyol mixture having a hydroxyl number of from 70 to 170 and containing a trifunctional polyoxyalkylene-polyol, e.g. oxypropylated glycerol, and up to 40% by weight of a polyoxyalkylene glycol, e.g. oxypropylated ethylene glycol, and an organic polyisocyanate, preferably tolylene diisocyanate (TDI), in the presence of water and a chlorofluorocarbon, preferably trichlorofluoromethane, as blowing agent.

Flexible PU foams are also described in GB-A- 1,064,576, in which organic diisocyanates, preferably TDI, are reacted with a mixture of from 50 to 90% by weight of a polyoxyalkylene-triol having a hydroxyl number of from 30 to 170 and from 10 to 50% by weight of a polyoxyalkylene-diol having a hydroxyl number of from 40 to 110, the mixture containing from 10 to 65% of primary hydroxyl groups, in the presence of water.

The preparation of diphenylmethane diisocyanate compositions which are liquid at room temperature is also known.

According to DE-C-16 18 380 (U.S. Pat. No. 3,644,457), these are prepared by reacting one mol of 4,4'- and/or 2,4'-MDI with from 0.1 to 0.3 mol of tri-1,2-oxypropylene glycol and/or poly-1,2-oxypropylene glycol having a molecular weight of up to 700.

According to GB-A-1,369,334, the modification is carried out in two reaction steps and the modifier used is dipropylene glycol or polyoxypropylene glycol having a molecular weight of less than 2000.

DE-A-29 13 126 (U.S. Pat. No. 4,229,347) describes MDI compositions in which from 10 to 35% by weight of the isocyanate groups are reacted with a mixture of at least 3 alkylene glycols, these glycols being di-, tri- or a relatively high-molecular-weight polypropylene glycol.

In DE-A-24 04 166 (GB-A-1,430,455), by contrast, the modifiers mentioned are mixtures of a polyoxyethylene glycol or polyoxyethylene glycol mixture having a mean molecular weight of less than 650 and at least one alkylene glycol containing at least 3 carbon atoms.

DE-A-23 46 996 (GB-A-1,377,679) relates to MDI compositions in which from 10 to 35% by weight of the isocyanate groups have been reacted with a commercially available polyoxyethylene glycol.

Liquid polyisocyanate compositions have also been prepared in the presence of crude MDI in addition to MDI and glycols and/or polyoxyalkylene glycols.

According to EP-A-10 850, a polyisocyanate composition of this type comprises a mixture of crude MDI with a MDI which has been modified by means of polyoxy-alkylene-polyols having a functionality of from 2 to 3 and based on polyoxypropylene-polyol and possibly polyoxyethylene-polyol having a molecular weight of from 750 to 3000.

According to DE-B-27 37 338 (U.S. Pat. No. 4,055,548), a liquid crude MDI composition is obtained by combining crude MDI with a polyoxyethylene glycol having a mean molecular weight of from 200 to 600.

According to DE-B 26 24 526 (GB-A-1,550,325), a crude MDI containing from 88 to 95% by weight of MDI and prepared by a specific process is reacted with polyoxypropylene glycol having a molecular weight in the range from 134 to 700.

DE-A-25 13 796 (GB-A-1,444,192) and DE-A- 25 13 793 (GB-A-1,450,660) relate to crude MDI compositions in which the crude MDI has been modified by alkylene glycols or polyoxyalkylene glycols in certain amounts.

Although said alkylene glycols or polyoxyalkylene glycols cause liquefaction of the 4,4'- or 2,4'-MDI isomers, which melt at 42° C. or 28° C. respectively, it is disadvantageous, however, that the polyisocyanate compositions tend to form crystalline deposits at temperatures around 10° C. after extended storage times.

It is furthermore known that flexible PU foams can be prepared using, as the polyisocyanate component, crude MDI compositions which have been modified by means of urethane groups.

According to EP-A-22 617, its preparation can be carried out using a difunctional to trifunctional polyoxypropylene-polyoxyethylene-polyol containing at least 50% by weight of polymerized oxyethylene groups with a mixture of MDI isomers, and then diluting the resultant quasi-prepolymer with crude MDI. The PU foams described have the disadvantage, in particular, of low tensile strength and tear propagation strength.

Polyisocyanate mixtures based on crude MDI which have been modified by means of urethane groups and contain from 12 to 30% by weight of NCO groups are also described in EP-B-0 111 121 (U.S. Pat. No. 4,478,960). In order to modify the MDI or crude MDI, a polyoxypropylene-polyoxy-ethylene-polyol having a functionality of from 2 to 4, a hydroxyl number of from 10 to 65 and a content of polymerized ethylene oxide units of from 5 to 30% by weight is employed. Using these polyisocyanate mixtures which have been modified by means of urethane groups, PU foams having increased elongation at break and improved tensile strength and tear propagation strength can be prepared. The only disadvantage of these PU foams is that they contain chlorofluorocarbons as cell gas.

It is an object of the present invention to improve the mechanical properties of flexible PU foams and flexible, elastic PU molded foams prepared using alternative, i.e. CFC-free, blowing agents or blowing agent combinations. The PU formulations which can be used for this purpose should have a broad processing latitude within the system components with respect to hydroxyl number variations in the polyol component and isocyanate index during preparation of the foam and in various foaming units.

Good compatibility of the system components and their miscibility and the miscibility of the reaction mixture with polar blowing agents, e.g. water or carboxyl-containing compounds, or non-polar blowing agents, e.g. alkanes or fluoroalkanes, or of mixtures of polar and non-polar blowing agents, should be ensured. Through these measures, the process reliability should be increased and the rejection rate reduced to a minimum.

We have found that, surprisingly, this object is achieved by preparing PU foams using liquid polyisocyanate mixtures based on MDI which have been modified by means of a mixture of non-polar and polar polyether-polyols containing urethane groups.

The present invention accordingly provides a process for the preparation of CFC-free flexible PU foams and flexible, elastic PU molded foams by reacting A) liquid diphenylmethane diisocyanate-based polyisocyanate mixtures containing bonded urethane groups with B) relatively high-molecular-weight polyhydroxyl compounds and C) if desired low-molecular-weight chain extenders and/or crosslinking agents, in the presence of D) blowing agents, E) catalysts and, if desired, F) assistants and/or additives, wherein the liquid polyisocyanate mixtures A) containing bonded urethane groups contain from 20 to 30% by weight of NCO groups, based on the total weight, and are obtained I) by reacting
  a) a mixture (I) of diphenylmethane diisocyanates and polyphenylene-polymethylene polyisocyanates (crude MDI) containing from 35 to 94% by weight, based on the total weight, of diphenyl-methane diisocyanate (MDI) isomers, with
  b) a polyether-polyol mixture (b) which contains
    $b_1$) at least one polyoxypropylene glycol having a hydroxyl number of from 120 to 25, and
    $b_2$) at least one trifunctional polyoxypropylene-polyoxyethylene-polyol having a hydroxyl number of from 120 to 25 and containing from 10 to 90% by weight, based on the weight of polymerized alkylene oxide units, of polymerized ethylene oxide units, or II) by diluting
  c) a quasi-prepolymer containing urethane groups and containing from 10 to 19% by weight of NCO, obtained by reacting 4,4'-diphenylmethane diisocyanate (MDI) or a mixture of diphenylmethane diisocyanate (MDI) isomers (II) with the polyether-polyol mixture (b), using a mixture (I) of diphenylmethane diisocyanates and polyphenyl-polymethylene polyisocyanates (crude MDI).

The present invention furthermore provides the liquid diphenylmethane diisocyanate-based polyisocyanate mixtures containing urethane groups and containing from 20 to 30% by weight of NCO groups which are obtained I) by reacting
  a) a mixture (I) of diphenylmethane diisocyanates and polyphenylene-polymethylenepolyisocyanates (crude MDI) containing from 35 to 94% by weight, based on the total weight, of diphenylmethane diisocyanate (MDI) isomers, with
  b) a polyether-polyol mixture (b) which contains
    $b_1$) at least one polyoxypropylene glycol having a hydroxyl number of from 120 to 25, and
    $b_2$) at least one trifunctional polyoxypropylene-polyoxyethylene-polyol having a hydroxyl number of from 120 to 25 and containing from 10 to 90% by weight, based on the weight of polymerized alkylene oxide units, of polymerized ethylene oxide units, or II) by diluting
  c) a quasi-prepolymer containing urethane groups and containing from 10 to 19% by weight of NCO, obtained by reacting 4,4'-diphenylmethane diisocyanate (MDI) or a mixture of diphenylmethane diisocyanate (MDI) isomers (II) with the polyether-polyol mixture (b),
  a) using the abovementioned mixture (I) of diphenylmethane diisocyanates and polyphenylpolymethylene polyisocyanates (crude MDI) containing from 35 to 94% by weight, based on the total weight, of diphenylmethane diisocyanate (MDI) isomers, which can be used for the process according to the invention for the preparation of the CFC-free flexible PU foams or molded foams.

The flexible PU foams or molded foams prepared by the process according to the invention using the specific polyisocyanate mixtures (A) modified by means of urethane groups have a high level of mechanical properties, it being possible, depending on the type of preparation, in one step (I) or in two steps (II), of the polyisocyanate mixtures (A) modified by means of urethane groups, to modify their physical properties and the mechanical properties of the PU foams prepared therefrom in a targeted manner. If the polyisocyanate mixtures (A) modified by means of urethane groups are prepared by the one-step process (I), which is less time-consuming and therefore lower cost, and is simple to carry out, the resultant polyisocyanate mixtures (A) have considerably lower viscosity than the polyisocyanate mixtures (A) modified by means of urethane groups obtained by the two-step process (II). Reaction mixtures formed from polyisocyanate mixtures of this type remain flowable for a longer time and have significantly better flow properties, so that even molds having spatial shapes and narrow flow paths which are difficult to fill can be filled completely with relatively few difficulties. The PU foams prepared furthermore have improved tensile strength and elongation. If, by contrast, the PU foams are prepared using the relatively high-viscosity polyisocyanate mixtures containing urethane groups prepared by the two-step process (II), products are obtained which have lower tensile strength and elongation, but improved compression set and compressive strength. The use of the polyether-polyol mixture (B) furthermore improves the low-temperature stability of the polyisocyanate mixtures (A).

The following details apply to the preparation of the novel, liquid, MDI-based polyisocyanate mixtures (A) containing bonded urethane groups and to the other formative components (B) to (F) which can be used for the process according to the invention for the preparation of the CFC-free flexible PU foams or molded foams:

The following crude MDI (I) and MDI isomer (II) mixtures and polyether-polyol mixtures (b) are advantageously used to prepare the liquid polyisocyanate mixtures (A) containing bonded urethane groups and containing from 20 to 30% by weight, preferably from 24 to 29% by weight, of NCO groups:

Suitable mixtures (I) of diphenylmethane diisocyanates and polyphenylpolymethylene polyisocyanates, usually known as crude MDI, contain, in addition to higher homologs, from 35 to 94% by weight, preferably from 59 to 85% by weight, of MDI isomers. Crude MDI which has proven highly successful contains or preferably comprises, based on the total weight, Ia1) from 34 to 68% by weight, preferably from 51 to 65% by weight, of 4,4'-MDI, Ia2) from 1 to 25% by weight, preferably from 8 to 20% by weight, of 2,4'-MDI, Ia3) from 0 to 4% by weight, preferably from 0.5 to 2.5% by weight, of 2,2'-MDI and Ia4) from 65 to 3% by weight, preferably from 41 to 15% by weight, of at least trifunctional polyphenyl-polymethylene polyisocyanates.

Mixtures of MDI isomers (II) expediently contain or preferably comprise, based on the total weight, IIa1) from 90 to 48% by weight, preferably from 80 to 60% by weight, of 4,4'-MDI, IIa2) from 10 to 48% by weight, preferably from 20 to 40, of 2,4'-MDI and IIa3) from 0 to 4% by weight, preferably from 0 to 2% by weight, of 2,2'-MDI.

The polyether-polyol mixtures (b) which can be used according to the invention as modifiers usually have a functionality in the range from 2.05 to 2.95, preferably from 2.2 to 2.7, and contain or preferably comprise b1) at least one polyoxypropylene glycol having a hydroxyl number of from 120 to 25, preferably from 80 to 40, and b2) at least one trifunctional polyoxypropylene-polyoxyethylene-polyol having a hydroxyl number of from 120 to 95, preferably from 80 to 40, and a content of polymerized ethylene oxide units of from 10 to 90% by weight, preferably from 20 to 85% by weight, in particular from 50 to 80% by weight, based on the total weight of polymerized ethylene oxide units and propylene oxide units. The polymerized 1,2-propylene oxide groups and ethylene oxide groups may be bonded here in a random distribution or as internal or terminal blocks. Depending on the content of ethylene oxide units and the position thereof in the polyoxypropylene-polyoxyethylene-polyol, the reactivity thereof and the miscibility with MDI or crude MDI and the polar and non-polar blowing agents in the reaction mixture can be matched to the particular requirements in a targeted manner. The poly-ether-polyol mixtures (b) used to modify the MDI or crude MDI are expediently those which contain or preferably comprise, based on the total weight, b1) from 80 to 20% by weight, preferably from 60 to 40% by weight, of at least one polyoxypropylene glycol having a hydroxyl number of from 120 to 25, and b2) from 20 to 80% by weight, preferably from 40 to 60% by weight, of at least one trifunctional polyoxy-propylene-polyoxyethylene-polyol having a hydroxyl number of from 120 to 25 and having a content of polymerized ethylene oxide units of from 10 to 90% by weight, based on the weight of polymerized alkylene oxide units. The polyoxypropylene glycols and trifunctional polyoxypropylene-polyoxyethylene-polyols may thus each be used individually or as mixtures.

A polyether-polyol mixture (b) which has proven very successful and is therefore particularly preferred comprises, based on the total weight, b1) 50% by weight of a polyoxypropylene glycol having a hydroxyl number of 56 and b2) 50% by weight of a glycerol-initiated polyoxypropylene-polyoxyethylene-polyol having a hydroxyl number of 42 and having a content of polymerized ethylene oxide units of 70% by weight, based on the total weight of polymerized alkylene oxide units.

Suitable initiator molecules for the preparation of the polyoxypropylene glycols (b1) or trifunctional polyoxypropylene-polyoxyethylene-polyols (b2) in the presence of basic catalysts are difunctional or trifunctional polyols and water. Examples which may be mentioned are the initiator molecules water, 1,2- and 1,3-propylene glycol for the preparation of polyoxypropylene glycols and trimethylolpropane and preferably glycerol for the preparation of polyoxypropylene-polyoxyethylene-polyols.

Customary basic catalysts are alkali metal alkoxides having 1 to 4 carbon atoms in the alkyl radical, such as sodium methoxide, sodium ethoxide, potassium ethoxide, potassium isopropoxide and sodium butoxide, alkaline earth metal hydroxides, e.g. calcium hydroxide, and preferably alkali metal hydroxides, in particular, for example, sodium hydroxide and potassium hydroxide.

In order to prepare the polyisocyanate mixture (A) which can be used according to the invention and contains urethane groups by the preferred process variant (I), the crude MDI (I) and the polyether-polyol mixture (b) of at least one polyoxypropylene glycol (b1) and at least one trifunctional polyoxypropylene-polyoxyethylene-polyol (b2) are reacted at from 0° to 100° C., preferably from 30° to 80° C., in such amounts that the NCO:OH group ratio is from 1:0.001 to 1:0.19, preferably from 1:0.01 to 1:0.1. After a reaction time of from 0.5 to 6 hours, preferably from 1 to 3 hours, the storage-stable, MDI-based polyisocyanate mixture (A), which contains from 20 to 30% by weight of NCO groups, is allowed to cool.

If the polyisocyanate mixtures (A) which can be used according to the invention are prepared by process variant (II), a mixture of MDI isomers (II) or preferably 4,4'-MDI and the polyether-polyol mixture (b) of (b1) and (b2) is reacted at from 0° to 100° C., preferably from 30° to 80° C., in such an amount that the NCO:OH group ratio is from 1:0.001 to 1:0.2, preferably from 1:0.02 to 1:0.15. After a reaction time of from 0.5 to 6 hours, preferably from 1 to 3 hours, the MDI-based quasi-prepolymer containing urethane groups and having an NCO content of from 10 to 19% by weight, preferably from 12 to 18% by weight, is allowed to cool and is diluted with crude MDI (I) to an NCO content of from 20 to 30% by weight, preferably from 24 to 29% by weight.

In an advantageous embodiment of process variants (II), based on 100 parts by weight, a) X parts by weight of 4,4'-MDI, where X is a value in the range from 34 to 68 parts by weight, or a mixture of X parts by weight of 4,4'-MDI and Y parts by weight of 2,4'-MDI, where X is as defined above and Y is a value in the range from 1 to 25 parts by weight, are reacted with b) a polyether-polyol mixture (b) containing (b1) and (b2) to give a quasi-prepolymer containing urethane groups and having an NCO content of from 10 to 19% by weight.

This quasi-prepolymer is then diluted with crude MDI containing

Ia1) (34 to 68)—X parts by weight of 4,4'-MDI,

Ia2) (1 to 25)—Y parts by weight of 2,4'-MDI,

Ia3) from 0 to 4 parts by weight of 2,2-MDI and

Ia4) from 65 to 3 parts by weight of at least trifunctional polyphenyl-polymethylene polyisocyanates, with the proviso that X+Y+Ia1+Ia2+Ia3+Ia4 adds up to 100 parts by weight and the total content of NCO groups has a value in the range from 20 to 30% by weight.

The polyisocyanate mixtures (A) prepared by process variants (I) and (II) and containing bonded urethane groups have a shelf life of at least 3 months at about 0° C. and have various viscosities, the polyisocyanate mixtures (A) prepared in two steps by process variant (II) having, as stated above, relatively high viscosity at the same NCO content.

In order to prepare the CFC-free flexible PU foams or flexible, elastic PU molded foams, the liquid, MDI-based polyisocyanate mixtures (A) containing bonded urethane groups are, as stated above, foamed with conventional relatively high-molecular-weight polyhydroxyl compounds (B) and, if desired, low-molecular-weight chain extenders and/or crosslinking agents (C), in the presence of blowing agents (D), catalysts (E) and, if desired, assistants and/or additives (F), in open or closed molds.

The relatively high-molecular-weight polyhydroxyl compounds (B) used here are preferably conventional linear and/or branched polyester-polyols and in particular polyether-polyols having molecular weights of from 800 to 8200, preferably from 1200 to 7000, in particular from 1800 to 6200. Also suitable, however, are polymer-modified polyether-polyols, polyether-polyol dispersions and other hydroxyl-containing polymers having the above-mentioned molecular weights, for example polyesteramides, polyacetals and/or polycarbonates, in particular those prepared from diphenyl carbonate and 1,6-hexanediol by transesterification, or mixtures of at least two of the said polyhydroxyl compounds.

Suitable polyester-polyols may be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms and/or dialkylene glycols. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or mixed with one another. The free dicarboxylic acids may also be replaced by the corresponding dicarboxylic acid derivatives, for example dicarboxylic acid esters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and in particular adipic acid. Examples of dihydric and polyhydric alcohols, in particular diols and dialkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol and mixtures of at least two of said diols, in particular mixtures of 1,4-butanediol, 1,5-pentanediol and 1,6-hexanediol. Furthermore, polyester-polyols made from lactones, e.g. ε-caprolactone or hydroxycarboxylic acids, e.g. ω-hydroxycaproic acid, may also be employed.

The polyester-polyols may be prepared by polycondensing the organic, e.g. aromatic and preferably aliphatic polycarboxylic acids and/or derivatives thereof and polyhydric alcohols and/or alkylene glycols without using a catalyst or preferably in the presence of an esterification catalyst, expediently in an inert gas atmosphere, e.g. nitrogen, carbon monoxide, helium, argon, inter alia, in the melt at from 150° to 250° C., preferably from 180° to 220° C. at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 4, in particular from 2 to 3, and a molecular weight of from 800 to 3600, preferably from 1200 to 3000, in particular from 1800 to 2500.

However, the preferred polyhydroxyl compounds are polyether-polyols prepared by conventional processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 4, preferably 2 or 3, bonded reactive hydrogen atoms or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4and 2,6-tolylenediamine and 4,4'- 2,4'- and 2,2'-diaminodiphenylmethane.

Other suitable initiator molecules are alkanolamines, e.g. ethanolamine, N-methyl- and N-ethylethanolamine, dialkanolamines, e.g. diethanolamine, N-methyl- and N-ethyldiethanolamine, and trialkanolamines, e.g. triethanolamine, and ammonia. Preference is given to polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane and pentaerythritol.

The polyether-polyols, preferably polyoxypropylene- and polyoxypropylene-polyoxyethylene-polyols, have a functionality of from 2 to 4, preferably 2 or 3, and molecular weights of from 800 to 8200, preferably from 1200 to 7000, in particular from 1800 to 6200, and suitable polyoxytetramethylene glycols have a molecular weight of up to approximately 3500.

Other suitable polyether-polyols are polymer-modified polyether-polyols, preferably graft polyether-polyols, in particular those based on styrene and/or acrylonitrile and prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 556 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tert-amino groups in bound form, and/or melamine and are described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. Furthermore, they may be mixed with the graft polyether-polyols or polyester-polyols and the hydroxyl-containing polyesteramides, polyacetals and/or polycarbonates. Particular success has been achieved using, for example, mixtures having a functionality of from 2 to 3 and a molecular weight of from 800 to 8200 which contain at least one polyether-polyol and at least one polymer-modified polyether-polyol from the group consisting of the graft polyether-polyols, or polyetherpolyol dispersions which contain, as the disperse phase, polyureas, polyhydrazides or polyurethanes containing bonded tertiary amino groups.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate, or phosgene.

The polyester amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

The CFC-free flexible PU foams or molded foams can be prepared in the presence or absence of chain extenders and/or crosslinking agents (C). However, it may prove advantageous, in order to modify the mechanical properties, for example the hardness, to add chain extenders, crosslinking agents or, if desired, mixtures thereof. Suitable chain extenders and/or crosslinking agents of this type are polyfunctional, in particular difunctional and trifunctional compounds having molecular weights of from 18 to approximately 400, preferably from 62 to approximately 300. For example, di- and/or tri-alkanolamines, e.g. diethanolamine and triethanolamine, alkylene glycols, e.g. diethylene glycol and dipropylene glycol, aliphatic diols and/or triols having 2 to 6 carbon atoms in the alkylene radical, e.g. ethanediol, 1,3-propanediol, 1,4-butanediol, 1,5-pentanediol, 1,6-hexanediol, glycerol and/or trimethylolpropane, and low-molecular-weight ethoxylation and/or propoxylation products prepared from the abovementioned dialkanolamines, trialkanolamines, diols and/or triols, and aliphatic and/or aromatic diamines, e.g. 1,2-ethanediamine, 1,4-butanediamine, 1,6-hexanediamine, 2,3-, 2,4and/or 2,6-tolylenediamine, 4,4'-diaminodiphenylmethane, 3,3'-di- and/or 3,3',5,5'-tetraalkyl-substituted 4,4'-diaminodiphenylmethanes as initiator molecules and alkylene oxide or alkylene oxide mixtures.

Preferred chain extenders and/or crosslinking agents (C) are dialkanolamines, diols and/or triols and in particular diethanolamine, 1,6-hexanediol, 1,4-butanediol, trimethylolpropane and glycerol, or mixtures thereof.

The chain extenders and/or crosslinking agents (C) which are preferably present in the preparation of the flexible PU foams or molded foams are expediently used in such amounts that from 0.01 to 8 mol, in particular from 0.1 to 3 mol, of chain extender and/or crosslinking agent are present in the reaction mixture per mol of relatively high-molecular-weight polyhydroxyl compound (B).

The blowing agents (D) which can be used to prepare the flexible PU foams or molded foams preferably include water, which reacts with isocyanate groups to form carbon dioxide. The amount of water expediently employed is from 0.1 to 8 parts by weight, preferably from 1.5 to 5.0 parts by weight, in particular from 2.5 to 3.5 parts by weight, based on 100 parts by weight of the polyhydroxyl compounds (B).

Other suitable blowing agents are liquids which are inert toward the liquid polyisocyanate mixtures (A) modified by means of urethane groups and have boiling points of below 100° C. preferably below 50° C., in particular from −50° to 30° C. at atmospheric pressure, so that they evaporate under the conditions of the exothermic polyaddition reaction, and mixtures of physical blowing agents of this type and water. Examples of preferred liquids of this type are alkanes, e.g. heptane, hexane, n- and isopentane, preferably technical-grade mixtures of n- and isopentanes, n- and isobutane and propane, cycloalkanes, such as cyclopentane and/or cyclohexane, ethers, e.g. furan, dimethyl ether and diethyl ether, ketones, e.g. acetone and methyl ethyl ketone, alkyl carboxylates, such as methyl formate, dimethyl oxalate and ethyl acetate, and halogenated hydrocarbons, such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. It is also possible to use mixtures of these low-boiling liquids with one another and/or with other substituted or unsubstituted hydrocarbons. Also suitable are organic carboxylic acids, e.g. formic acid, acetic acid, oxalic acid, ricinoleic acid and carboxyl-containing compounds.

Preference is given to water, chlorodifluoromethane, chlorodifluoroethanes, dichlorofluoroethanes, pentane mixtures, cyclohexane and mixtures of at least two of these blowing agents, for example mixtures of water and cyclohexane, mixtures of chlorodifluoromethane and 1-chloro-2,2-difluoroethane and if desired water. Chlorofluorocarbons, which damage the ozone layer, are not used as blowing agent.

The necessary amount of physical blowing agent can be determined experimentally in a simple manner as a function of the desired foam density and the amount of water employed in some cases and is from about 0 to 25 parts by weight, preferably from 0 to 15 parts by weight, per 100 parts by weight of the polyhydroxyl compounds. It may be expedient to mix the polyisocyanate mixtures (A) containing bonded urethane groups with the inert physical blowing agents and thus to reduce their viscosity.

The catalysts (E) used to prepare the CFC-free flexible PU foams and flexible, elastic PU molded foams are preferably compounds which greatly accelerate the reaction of the hydroxyl-containing compounds of component (B) and, if used, (C) with the liquid, MDI-based polyisocyanate mixtures (A) containing bonded urethane groups. Suitable compounds are organometallic compounds, preferably organotin compounds, such as tin(II) salts of organic carboxylic acids, e.g. tin(II) diacetate, tin(II) dioctanoate, tin(II) ethylhexanoate and tin(II) laurate, and dialkyltin(IV) salts of organic carboxylic acids, e.g. dibutyltin diacetate, dibutyltin dilaurate, dibutyltin maleate and dioctyltin diacetate, and highly basic amines, for example amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethyl-ethylene-diamine, N,N,N',N'-tetramethylbutane-diamine, N,N,N',N'-tetramethyl-1,6-hexanediamine, di-(4-dimethyl-aminocyclohexyl)-methane, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and, preferably, 1,4-diazabicyclo[2.2.2]octane and alkanolamine compounds such as triethanolamine, triisopropanolamine, N-methyl- and N-ethyldiethanolamine and dimethylethanolamine.

Other suitable catalysts are tris-(dialkylamino-alkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of long-chain fatty acids having from 10 to 20 carbon atoms and possibly containing lateral OH groups, and combinations of the organometallic compounds and highly basic amines. From 0.001 to 5% by weight, in particular from 0.05 to 2% by weight of catalyst or catalyst combination is preferably used, based on the weight of the polyhydroxyl compound (B).

If desired, assistants and/or additives (F) may also be incorporated into the reaction mixture for the preparation of the flexible PU foams or molded foams. Specific examples are surfactants, foam stabilizers, cell regulators, fillers, dyes, pigments, flameproofing agents, hydrolysis-protection agents, and fungistatic and bacteriostatic substances.

Examples of suitable surfactants are compounds which serve to support homogenization of the starting materials and may also regulate the cell structure. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, e.g. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric polyacrylates containing polyoxyalkylene and fluoroalkane radicals as side groups. The surfactants are usually used in amounts of from 0.01 to 5 parts by weight, based on 100 parts by weight of the polyhydroxyl compounds (B).

For the purposes of the present invention, fillers, in particular reinforcing fillers, are conventional organic and inorganic fillers, reinforcing agents and weighting agents. Specific examples are inorganic fillers, such as silicate minerals, for example phyllosilicates, such as antigorite, serpentine, hornblendes, amphiboles, chrysolite, zeolites and talc; metal oxides, such as kaolin, aluminum oxides, aluminum silicate, titanium oxides and iron oxides, metal salts, such as chalk, baryte and inorganic pigments, such as cadmium sulfide, zinc sulfide and glass particles. Examples of suitable organic fillers are carbon black, melamine, colophony, cyclopentadienyl resins and graft polymers.

The inorganic and organic fillers may be used individually or as mixtures and are advantageously introduced into the reaction mixture in amounts of from 0.5 to 50% by weight, preferably from 1 to 40% by weight, based on the weight of components (A) to (C).

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate.

In addition to the abovementioned halogen-substituted phosphates, it is also possible to use inorganic flameproofing agents, such as red phosphorus, aluminum oxide hydrate, antimony trioxide, arsenic oxide, ammonium polyphosphate, expandable graphite and calcium sulfate, or cyanuric acid derivatives, e.g. melamine, or mixtures of two or more flameproofing agents, e.g. ammonium polyphosphate and melamine and/or expandable graphite and if desired starch, in order to flameproof the flexible PU foams or molded foams prepared according to the invention. In general, it has proven expedient to use from 5 to 50 parts by weight, preferably from 5 to 25 parts by weight, of said flameproofing agents or mixtures per 100 parts by weight of components (A) to (C).

Further details on the other conventional assistants and additives mentioned above can be obtained from the specialist literature, for example from the monograph by J. H. Saunders and K. C. Frisch, High Polymers, Volume XVI, Polyurethanes, Parts 1 and 2, Interscience Publishers 1962 and 1964 respectively, or Kunststoff-Handbuch, Polyurethane, Volume VII, Carl-Hanser-Verlag, Munich, Vienna, 1st and 2nd Editions, 1966 and 1983.

To prepare the flexible PU foams or molded foams, the liquid polyisocyanate mixtures (A) containing bonded urethane groups, the relatively high-molecular-weight polyhydroxyl compounds (B) and, if desired, chain extenders and/or crosslinking agents (C) are reacted in the presence of blowing agents (D), catalysts (E) and, if desired, assistants and/or additives (F) at from 0° to 100° C., preferably from 15° to 80° C., in such mixing ratios that from 0.5 to 2, preferably from 0.8 to 1.3, and in particular approximately one reactive hydrogen atom bonded to the starting components (B) and, if used, (C) is present per NCO group, and, if water is the blowing agent, the molar ratio between the number of equivalents of water and the number of equivalents of NCO groups is from 0.5 to 5:1, preferably from 0.7 to 0.95:1, in particular from 0.75 to 0.85:1.

The flexible PU foams or molded foams are expediently prepared by the one-shot process by mixing two components, the starting components (B), (D), (E) and, if used, (C) and (F) being combined to form the so-called polyol component, and the polyisocyanate component used being the polyisocyanate mixture containing bonded urethane groups, if desired mixed with (F) and inert, physical blowing agents. Since the polyol component and the polyisocyanate component have very long shelf lives, they need only be mixed vigorously before preparation of the flexible PU foams or molded foams. The reaction mixture can be foamed in open or closed molds; it is furthermore suitable for the preparation of slabstock foams.

To prepare the flexible PU molded foams, the reaction mixture, advantageously at from 15° to 80° C., preferably from 30° to 65° C., is introduced into an expediently metallic, temperature-controllable mold. The mold temperature is usually from 20° to 90° C., preferably from 35° to 70° C. The reaction mixture can be cured in the closed mold with compaction, for example at a degree of compaction of from 1.1 to 8, preferably from 2 to 6, in particular from 2.2 to 4.

The flexible PU foams have free-foamed densities of from 30 to 45 g/l, preferably from 32 to 40 g/l, in particular from 35 to 38 g/l. Flexible, elastic PU foam moldings produced from foam formulations of this type have, depending on the degree of compaction used, an overall density of from 40 to 60 g/l, preferably from 45 to 55 g/l, flexible PU molded foams for shoe soles having a density of, in particular, from 400 to 650 g/l.

The flexible PU foams prepared by the process according to the invention are suitable, for example, as seat cushions for upholstered furniture, and the flexible PU molded foams are suitable as cushioning elements, armrests, headrests, sun visors and safety covers in vehicle passenger compartments, preferably in motor vehicles and aircraft. Flexible PU molded foams have furthermore proven highly successful as inners for climbing boots and ski boots and in particular as shoe soles.

EXAMPLES

Preparation of the liquid MDI-based polyisocyanate mixtures containing bonded urethane groups by the one-step process.

EXAMPLE 1

To a mixture of diphenylmethane diisocyanates and polyphenylpolymethylene polyisocyanates (crude MDI) which comprised 4080 parts by weight (58.3% by weight) of 4,4'-MDI,
1000 parts by weight (14.3% by weight) of 2,4'-MDI,
120 parts by weight (1.7% by weight) of 2,2'-MDI and
1800 parts by weight (25.7% by weight) of at least trifunctional polyphenyl-polymethylene polyisocyanates was added at 80° C. with stirring, a mixture of 900 parts by weight of a 1,3-propanediol-initiated polyoxypropylene glycol having a hydroxyl number of 56 (corresponding to a molecular weight of 2000) and
900 parts by weight of a glycerol-initiated polyoxypropylene-polyoxyethylene-polyol having a hydroxyl number of 46 (corresponding to a molecular weight of 4000) and containing 70% by weight, based on the total weight of alkylene oxide units, of polymerized ethylene oxide units.

After a post-reaction time of one hour at 80° C., this polyisocyanate mixture containing urethane groups was allowed to cool to room temperature. The product had an NCO content of 25% by weight and a viscosity at 25° C. of 210 mPas.

COMPARATIVE EXAMPLE VB1

The procedure was similar to that of Example 1, but 1800 parts by weight of the 1,3-propanediol-initiated polyoxypropylene glycol having a hydroxyl number of 56 were used.

The resultant polyisocyanate mixture modified by means of urethane groups had an NCO content of 25% by weight and a viscosity at 25° C. of 168 mPas.

EXAMPLE 2

To a crude MDI which comprised 5220 parts by weight (52.2% by weight) of 4,4'-MDI,
1080 parts by weight (10.8% by weight) of 2,4'-MDI,
120 parts by weight (1.2% by weight) of 2,2'-MDI and
3600 parts by weight (36% by weight) of at least trifunctional polyphenyl-polymethylene polyisocyanates was added at 80° C. with stirring, a mixture of
1250 parts by weight of the abovementioned 1,3-propanediol-initiated polyoxypropylene glycol having a hydroxyl number of 56 and
1250 parts by weight of the abovementioned glycerol-initiated polyoxypropylene-polyoxy-ethylene-polyol having a hydroxyl number of 46.

After a post-reaction time of one hour at 80° C., this polyisocyanate mixture containing urethane groups was allowed to cool to room temperature. The product had an NCO content of 25% by weight and a viscosity at 25° C. of 379 mPas.

COMPARATIVE EXAMPLE VB2

The procedure was similar to that of Example 2, but 2400 parts by weight of the 1,3-propanediol-initiated polyoxypropylene glycol having a hydroxyl number of 56 were used.

The resultant polyisocyanate mixture modified by means of urethane groups had an NCO content of 25% by weight and a viscosity at 25° C. of 305 mPas.

Preparation of the liquid, MDI-based polyisocyanate mixture containing bonded urethane groups by the two-step process.

EXAMPLE 3

To 3000 parts by weight of 4,4'-MDI was added at 80° C. with stirring, a mixture which comprised 900 parts by weight of the abovementioned 1,3-propane-diol-initiated polyoxypropylene glycol having a hydroxyl number of 56 and 900 parts by weight of the abovementioned glycerol-initiated polyoxypropylene-polyoxyethylene-polyol having a hydroxyl number of 46.

After a post-reaction time of one hour at 80° C., the quasi-prepolymer containing urethane groups, which had an NCO content of 15.9% by weight, was allowed to cool to room temperature and was then diluted with 4000 parts by weight of crude MDI which comprised 1080 parts by weight (27% by weight) of 4,4'-MDI, 1000 parts by weight (25% by weight) of 2,4'-MDI, 120 parts by weight (3% by weight) of 2,2'-MDI and 1800 parts by weight (45% by weight) of at least trifunctional polyphenyl-polymethylene polyisocyanates.

The resultant polyisocyanate mixture containing bonded urethane groups had an NCO content of 25% by weight and a viscosity at 25° C. of 336 mPas.

COMPARATIVE EXAMPLE VB3

The procedure was similar to that of Example 3, but 1800 parts by weight of the 1,3-propanediol-initiated polyoxypropylene glycol having a hydroxyl number of 56 were used.

The resultant quasi-prepolymer had an NCO content of 15.7% by weight. The polyisocyanate mixture containing bonded urethane groups obtained by dilution with crude MDI had an NCO content of 25% by weight and a viscosity at 25° C. of 211 mPas.

Preparation of flexible, elastic PU molded foams

EXAMPLES 4 TO 10 AND COMPARATIVE EXAMPLES VB4 TO VB12

Polyol component: A mixture which comprised 86.24 parts by weight of a glycerol-initiated polyoxypropylene (86% by weight)-polyoxyethylene (14% by weight)-polyol having a molecular weight of approximately 6000, 27.54 parts by weight of a graft polyether-polyol having a molecular weight of approximately 6000 and a graft polymer content of 20% by weight, prepared from a trimethylolpropane-initiated polyoxypropylene (84% by weight)-polyoxyethylene (16% by weight)-polyol as the graft base and a mixture of acrylonitrile and styrene as the graft (Bayfit® 3699 from Bayer AG), 2.87 parts by weight of water, 0.47 part by weight of a 33% strength by weight solution of triethylenediamine in dipropylene glycol, 0.12 part by weight of a 70% strength by weight solution of bis(N,N-dimethylaminoethyl) ether in dipropylene glycol, 0.17 part by weight of N,N,N',N'-tetramethylhexamethylene-1,6-diamine and 0.69 part by weight of a silicone stabilizer (Tegostab® B 8701 from Goldschmidt), polyisocyanate component: liquid, MDI-based polyisocyanate mixtures containing bonded urethane groups prepared as described in Examples 1 and 3 and Comparative Examples VB1 to VB3.

To prepare the flexible, elastic PU molded foams, the polyol and polyisocyanate components were mixed vigorously for 8 seconds at 23° C. in amounts corresponding to the NCO index indicated below. From approximately 700 to 1000 g of the resultant reaction mixture were introduced into a metallic mold having the internal dimensions 40×40×10 cm held at 50° C., the mold was closed, and the reaction mixture was allowed to expand.

The flexible, elastic PU moldings formed were demolded after 4 minutes.

The polyisocyanate mixtures used, the NCO index and the mechanical properties measured on the resultant PU moldings are shown in the Table below.

TABLE

| | | | | | Mechanical properties | | | |
|---|---|---|---|---|---|---|---|---|
| Example | Comparative Example | Polyisocyanate mixture from Example or Comparative Example | NCO index | Density in accordance with DIN 53 420 [g/l] | Tensile strength in accordance with DIN 53 571 [kPa] | Elongation in accordance with DIN 53 571 [%] | Compressive set in accordance with DIN 53 572 [%] | Compression hardness at 40% compression in accordance with DIN 53 577 [kPa] |
| 4 | — | 1 | 100 | 43.7 | 123 | 94 | 4.2 | 3.6 |
| 5 | — | 1 | 75 | 48.2 | 100 | 110 | 5.3 | 2.5 |
| — | VB 4 | VB 1 | 100 | 56.7 | 109 | 86 | 3.3 | 7.3 |
| — | VB 5 | VB 1 | 90 | 55.7 | 88 | 86 | 3.2 | 5.2 |
| — | VB 6 | VB 1 | 75 | 55.7 | 65 | 101 | 4.5 | 2.9 |
| 6 | — | 2 | 100 | 50.2 | 95 | 70 | 3.9 | 6.3 |
| 7 | — | 2 | 75 | 57.1 | 68 | 84 | 4.0 | 4.6 |
| — | VB 7 | VB 2 | 100 | 49.9 | 99 | 74 | 4.3 | 6.1 |
| — | VB 8 | VB 2 | 90 | 51.9 | 69 | 75 | 3.5 | 4.6 |
| — | VB 9 | VB 2 | 75 | 54.7 | 63 | 78 | 2.5 | 3.4 |
| 8 | — | 3 | 105 | 48.1 | 99 | 84 | 11.1 | 6.2 |
| 9 | — | 3 | 85 | 44.4 | 70 | 84 | 11.8 | 3.5 |
| 10 | — | 3 | 70 | 46.1 | 54 | 92 | 10.8 | 2.4 |
| — | VB 10 | VB 3 | 100 | 48.9 | 98 | 92 | 3.9 | 4.8 |
| — | VB 11 | VB 3 | 90 | 46.4 | 79 | 91 | 3.5 | 3.3 |
| — | VB 12 | VB 3 | 75 | 51.2 | 69 | 107 | 3.6 | 2.4 |

We claim:

1. A process for the preparation of chlorofluorocarbon free flexible polyurethane foams and flexible, elastic polyurethane molded foams by reacting A) liquid diphenylmethane diisocyanate-based polyisocyanate mixtures containing bonded urethane groups with B) relatively high-molecular-weight polyhydroxyl compounds and C) in the presence or absence of low-molecular-weight chain extenders and/or crosslinking agents, in the presence of D) blowing agents, and E) catalysts wherein the liquid polyisocyanate mixtures A) containing bonded urethane groups contain from 20 to 30 percent by weight of NCO groups, based on the total weight, and are obtained I) by reacting
   a) a mixture (I) of diphenylmethane diisocyanates and polyphenylene-polymethylene polyisocyanates containing from 35 to 94 percent by weight, based on the total weight, of diphenylmethane diisocyanate isomers, with
   b) a polyether-polyol mixture (b) which contains
      $b_1$) at least one polyoxypropylene glycol having a hydroxyl number of from 120 to 25, and
      $b_2$) at least one trifunctional polyoxypropylene-polyoxyethylene-polyol having a hydroxyl number of from 120 to 25 and containing 30.1 to 90 percent by weight, based on the weight of polymerized alkylene oxide units, of polymerized ethylene oxide units, or II) by diluting
   c) a quasi-prepolymer containing urethane groups and containing from 10 to 19% by weight of NCO, obtained by reacting 4,4'-diphenylmethane diisocyanate or a mixture of diphenylmethane diisocyanate isomers (II) with the polyetherpolyol mixture (b), which contains
      $b_1$) at least one polyoxypropylene glycol having a hydroxyl number of from 120 to 25, and
      $b_2$) at least one trifunctional polyoxypropylene-polyoxyethylene-polyol having a hydroxyl number of from 120 to 25 and containing from 30.1 to 90 percent by weight, based on the weight of polymerized alkylene oxide units, of polymerized ethylene oxide units, using a mixture (I) of diphenylmethane diisocyanates and polyphenyl-polymethylene polyisocyanates.

2. The process as claimed in claim 1, wherein the mixture (I) of diphenylmethane diisocyanates and polyphenyl-polymethylene polyisocyanates contains, based on the total weight, Ia1) from 34 to 68% by weight of 4,4'-diphenylmethane diisocyanate, Ia2) from 1 to 25% by weight of 2,4'-diphenylmethane diisocyanate, Ia3) from 0 to 4% by weight of 2,2'-diphenylmethane diisocyanate and Ia4) from 65 to 3% by weight of at least trifunctional polyphenyl-polymethylene polyisocyanates.

3. The process as claimed in claim 1, wherein the mixture of diphenylmethane diisocyanate isomers(II) contains, based on the total weight, IIa1) from 90 to 48% by weight of 4,4'-diphenylmethane diisocyanate, IIa2) from 10 to 48% by weight of 2,4'-diphenylmethane diisocyanate and IIa3) from 0 to 4% by weight of 2,2'-diphenylmethane diisocyanate.

4. A process as claimed in claim 1, wherein, in order to prepare the polyisocyanate mixtures (A) containing urethane groups, a polyether-polyol mixture (b) is used, which contains, based on the total weight, b1) from 80 to 20% by weight of at least one polyoxypropylene glycol having a hydroxyl number of from 120 to 25 and b2) from 20 to 80% by weight of at least one trifunctional polyoxypropylene-polyoxyethylene-polyol having a hydroxyl number of from 120 to 25 and having a content of polymerized ethylene oxide units of from 10 to 90% by weight, based on the weight of polymerized alkylene oxide units.

5. The process as claimed in claim 1, wherein, in order to prepare the polyisocyanate mixtures (A) containing urethane groups, a polyether-polyol mixture (b) is used, which contains, based on the total weight, b1) 50% by weight of a polyoxypropylene glycol having a hydroxyl number of 56 and b2) 50% by weight of a glycerol-initiated polyoxypropylene-polyoxyethylene-polyol having a hydroxyl number of 42 and having a content of polymerized ethylene oxide units of 70% by weight, based on the weight of polymerized alkylene oxide units.

6. The process as claimed in claim 1, wherein the relatively high-molecular-weight polyhydroxyl compounds (B) are polyether-polyols having a functionality of from 2 to 3 and a molecular weight of from 800 to 8200 or mixtures, having a functionality of from 2 to 3 and a molecular weight of from 800 to 8200, of polyether-polyols of this type and polymer-modified polyether-polyols from the group consisting of the graft polyether-polyols, or polyether-polyol dispersions containing, as the disperse phase, polyureas, polyhydrazides or polyurethanes containing bonded tertiary amino groups.

7. The process as claimed in claim 1, wherein the blowing agent (D) is water or a physical blowing agent or a mixture of water and a physical blowing agent, with the proviso that the physical blowing agent cannot be a chlorofluorocarbon.

8. The process of claim 1, wherein the step of reacting A) and B) further comprises:

reacting A) and B) in the presence of D), E) and one or more materials selected from the group consisting of additives, assistants and mixtures thereof;

additives being selected from the group consisting of fillers, dyes, pigments, flame-proofing agents, hydrolysis-protection agents, fungistatic agents and bacteriostatic agents; and, assistants being selected from the group consisting of surfactants, foam stabilizers and cell regulators.

* * * * *